United States Patent [19]

Alon

[11] Patent Number: 4,837,718

[45] Date of Patent: Jun. 6, 1989

[54] DOPPLER RADAR METHOD AND APPARATUS FOR MEASURING A PROJECTILE'S MUZZLE VELOCITY

[75] Inventor: Yair Alon, Agoura, Calif.

[73] Assignee: Lear Siegler, Inc., Santa Monica, Calif.

[21] Appl. No.: 11,251

[22] Filed: Feb. 5, 1987

[51] Int. Cl.⁴ .................. G06F 15/14; G01L 5/14; G01S 13/58

[52] U.S. Cl. .................. 364/565; 364/423; 73/167; 342/104

[58] Field of Search ............... 364/423, 565; 342/104, 342/115, 116; 73/167; 89/6.5

[56] References Cited

U.S. PATENT DOCUMENTS

| | | |
|---|---|---|
| 2,524,610 | 10/1950 | Storm et al. |
| 3,072,857 | 1/1963 | Thaler. |
| 3,365,716 | 1/1968 | Jorgensen. |
| 3,444,557 | 5/1969 | Calhoon, Sr. et al. |
| 3,706,991 | 12/1972 | Gillmer et al. |
| 3,750,170 | 7/1973 | Brown. |
| 3,761,925 | 9/1973 | Bollard. |
| 3,898,659 | 8/1975 | Jensen et al. |
| 3,918,061 | 11/1975 | Elgaard. |
| 4,030,097 | 6/1977 | Gedeon. |
| 4,283,989 | 8/1981 | Toulios et al. ................. 89/6.5 |
| 4,457,206 | 7/1984 | Toulios et al. ................. 89/14 R |
| 4,555,705 | 11/1985 | Bossennec et al. ............. 342/115 |
| 4,739,329 | 4/1988 | Ward et al. ................... 364/423 |

Primary Examiner—Theodore M. Blum
Assistant Examiner—Gregory C. Issing
Attorney, Agent, or Firm—Pretty, Schroeder, Brueggemann & Clark

[57] ABSTRACT

A muzzle velocity chronograph method and apparatus for providing an accurate and precise measurement of the muzzle velocity of a projectile ejected from a gun. A conventional radar Doppler signal is sampled and digitized and arranged in a succession of groups, each group representing a separate time period. A fast-Fourier transform is then computed for each group of samples, and peak frequency measurements in the transformed data are tracked from one time period to the next. These peaks indicate the velocities of the projectile of interest and any other nearby moving objects. Finally, a least mean square error curve fit and standard regression algorithm are used to deduce the projectile's initial, muzzle velocity. The invention provides accurate muzzle velocity determinations even in circumstances where the Doppler signal contains substantial interference caused, for example, by random noise and the presence of moving fragments in the direction of the projectile.

29 Claims, 4 Drawing Sheets

DOPPLER RADAR METHOD AND APPARATUS FOR MEASURING A PROJECTILE'S MUZZLE VELOCITY

BACKGROUND OF THE INVENTION

This invention relates generally to methods and apparatus for measuring the muzzle velocity of a projectile ejected from a gun barrel, and, more particularly, to methods and apparatus of this kind that measure velocity using Doppler radar.

Apparatus of this particular kind are frequently called muzzle velocity chronographs. They include a radar device mounted on the gun barrel for directing a radar signal at the ejected projectile and correlating the radar signal with a reflected return signal, to produce a conventional Doppler signal. Each cycle of the Doppler signal represents movement of the projectile by a distance equal to one-half the wavelength of the radar signal. The typical muzzle velocity chronograph counts the number of cycles occurring in the Doppler signal per unit time, to determine the projectile's velocity. This process is repeated incrementally, to produce a velocity profile, from which the projectile's initial, muzzle velocity can be determined.

Chronographs of the kind described above, which utilize time domain processing, are usually effective in measuring a projectile's muzzle velocity. However, such chronographs have not proven to be entirely effective in situations where the return signal from the projectile is relatively weak or where substantial interference is present. This occurs, for example, when certain base-bleed ammunition is used, which produces fragments that are significantly larger than the projectile of interest.

It should therefore be appreciated that there is a need for an improved muzzle velocity chronograph that can effectively measure a projectile's muzzle velocity even when the projectile is relatively small and when the projectile is moving in the same direction as larger radar-reflecting fragments. The present invention fulfills this need.

SUMMARY OF THE INVENTION

The present invention is embodied in a method and apparatus for determining the muzzle velocity of a projectile ejected from a gun barrel, with substantially more accuracy and precision than is achieved by prior systems. The apparatus uses frequency-domain processing of a Doppler signal produced by a conventional radar device mounted on the gun barrel. Fourier transform means initially operates on a series of successive time segments of the Doppler signal, to produce a corresponding series of frequency spectrum signals. Detection means, responsive to the frequency spectrum signals, then measures the projectile's average velocity during the each successive time segment, and regression means, responsive to the successive projectile velocity measurements, determines the projectile's initial, muzzle velocity. The method and apparatus of the invention provide substantially more accurate and precise determinations of muzzle velocity, particularly in situation where the projectile is small or where the Doppler signal contains the effects of radar returns from fragments such as are encountered when using base-bleed ammunition.

More particularly, the invention is conveniently implemented by first digitizing the Doppler signal and then performing further processing using a digital signal processor. Thus, an analog-to-digital converter produces a sequence of digital words that are arranged in a series of K groups of N digital words each, where K and N are integers. The Fourier transform means computes the fast-Fourier transform of each of the K groups, to produce N discrete frequency measurements for each group. These frequency measurement signals indicate the frequency content, and thus velocity, of each radar-reflecting object (including the projectile of interest) during the particular time period associated with that group of digital words.

The detection means compares each of the N frequency measurements in each of the successive groups with a predetermined threshold that is selected in accordance with the level of background noise in the corresponding portion of the frequency spectrum. When any frequency measurement exceeds the threshold, it is deduced that an object of some kind is traveling relative to the gun barrel at a corresponding velocity. The center of gravity of each collection of frequency measurements exceeding their respective thresholds is then determined to provide a precise measure of the projectile's velocity. The variable threshold that is compared with each frequency measurement is selected to be a certain fraction of the average value of the measurements for nearby frequencies.

In some applications, multiple objects are represented in the Doppler signal, only one object of which is the projectile of interest. The detection means therefore measures the velocity of each such object during each of the successive time periods. Association means are included for associating together the particular velocity measurements in the successive time periods that correspond to each other, this being accomplished by comparing each velocity measurement with velocity measurements made for previous time periods. The detection means further includes means for discarding any velocity measurement that is harmonically related to any other velocity measurement, the assumption being made that the harmonic results from a mere distortion of the Doppler signal.

The regression means for determining the projectile's initial, muzzle velocity based on the velocity measurements for each of the successive time periods preferably implements a least mean square error (LMS) algorithm. In addition, enhanced accuracy can be achieved by discarding any of the successive velocity measurements that differ from the initial LMS velocity profile by more than a predetermined amount and by then redetermining the LMS profile using the remaining velocity measurements.

Other aspects and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
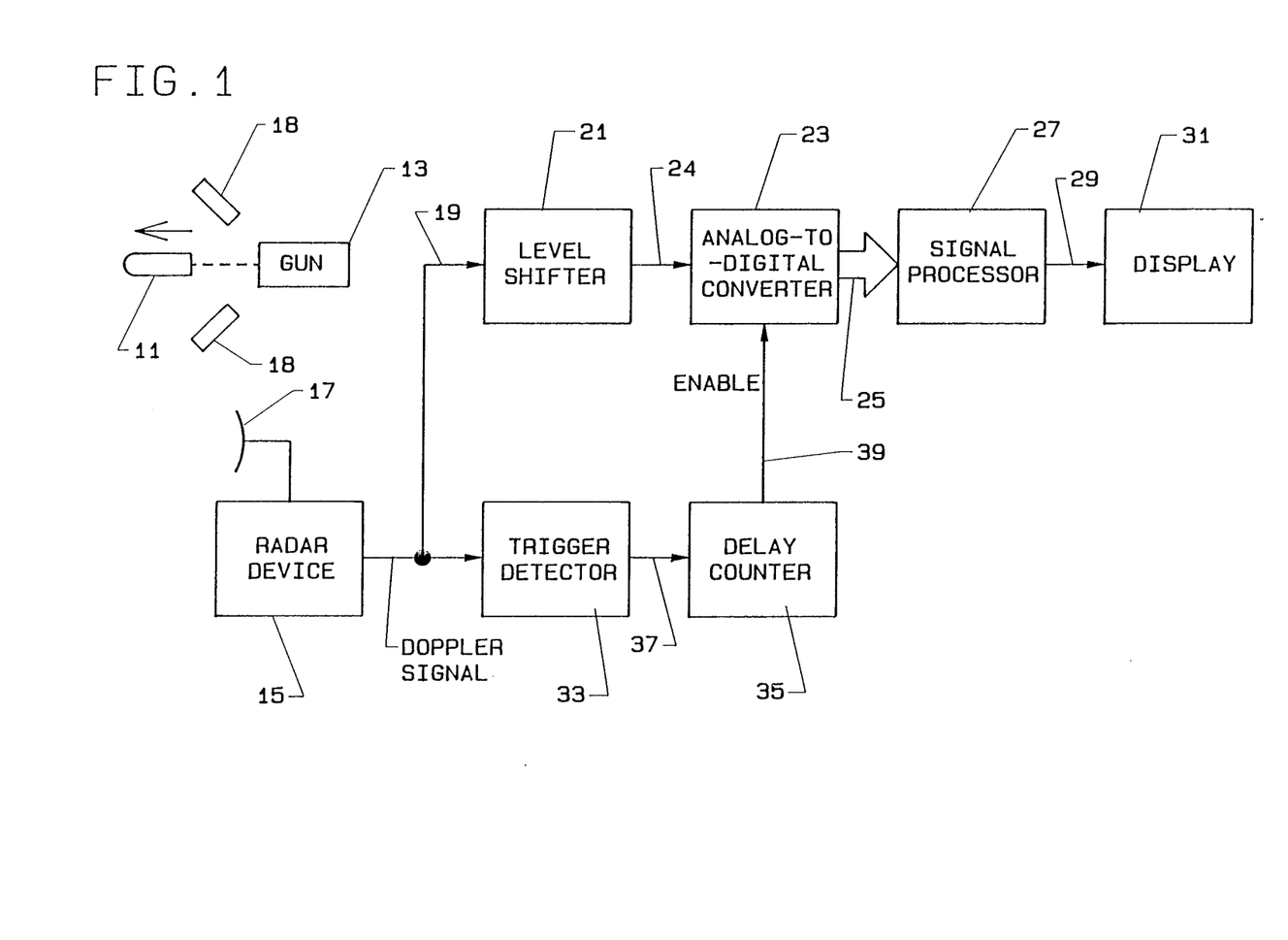
FIG. 1 is a simplified block diagram of a doppler radar apparatus for measuring the initial, muzzle velocity of a projectile ejected from a gun barrel.

With reference now to the drawings, and particularly to FIG. 1, there is shown a chronograph apparatus for estimating the initial, muzzle velocity of a projectile 11 ejected from a gun barrel 13. The apparatus estimates the projectile's muzzle velocity based on a succession of velocity measurements made as the projectile moves rapidly away, to a range of as much as about one thousand meters. The apparatus includes a radar device 15 mounted on the gun and having an antenna 17 for transmitting a radar signal in the expected direction of the ejected projectile. Return signals reflected from the projectile, and any other objects (e.g., fragments 18) located in the path of the radar signals, are received by the same antenna and correlated by the radar device with the original radar signals, to produce a Doppler signal for output on line 19. Return radar signals received from any object moving away from the gun barrel 13 will have a frequency that is lower than the transmit frequency by an amount proportional to the object's instantaneous velocity. The Doppler signal therefore will include a component having a frequency proportional to this difference. In the past, systems of this kind have typically measured this velocity by simply counting the number of cycles occurring in the Doppler signal over a predetermined time period. This has not proven effective, however, in situations where the Doppler signal includes significant frequency components derived from other moving objects 18 in the general direction of the projectile 11 of interest, which can mask the Doppler signal component of interest.

The apparatus of FIG. 1 overcomes this deficiency of prior chronograph apparatus by digitally processing the Doppler signal in the frequency domain. Thus, the apparatus includes a level shifter 21 and an analog-to-digital (A/D) converter 23 for converting the Doppler signal on line 19 into a succession of digital words. The level shifter is included merely to ensure that the Doppler signal's voltage levels are compatible with the A/D converter. The level-shifted Doppler signal is transmitted from the level shifter to the A/D converter on line 24. The A/D converter's sample rate is preferably on the order of 300 kilohertz, to ensure that, at the standard radar frequency used, the sample rate is at least twice the highest expected frequency component of interest in the Doppler signal. This prevents aliasing errors that could lead to ambiguities in the projectile velocity measurements.

The successive samples made by the A/D converter 23 are transmitted on lines 25 to a random-access memory that is part of a signal processor 27. Samples are accumulated for approximately 400 milliseconds, after which the signal processor begins processing the samples to determine the projectile's muzzle velocity. After the processing has been completed, the signal processor transmits the muzzle velocity measurement on line 29 to a display device 31, for visible display. In addition, the muzzle velocity measurement can also be transmitted to a fire control apparatus (not shown in the drawings), for adjusting the gun barrel's direction for subsequent firings.

Firing of the gun 13 creates an ionization of the space immediately surrounding it. This ionization, which has a duration of about 50 to 100 milliseconds, effectively precludes the obtaining of any significant information from the Doppler signal during this period. The apparatus therefore includes a trigger detector 33 and a delay counter 35 for enabling operation of the A/D converter 23 only after the ionization has dissipated. In particular, the trigger detector monitors the Doppler signal present on line 19 and senses any large increase in power, which indicates the firing of the gun. An appropriate trigger signal is then transmitted on line 37 to the delay counter, which times out a predetermined delay on the order of 50 to 100 milliseconds, after which an enable signal is transmitted to the A/D converter on line 39.

Figure 2:
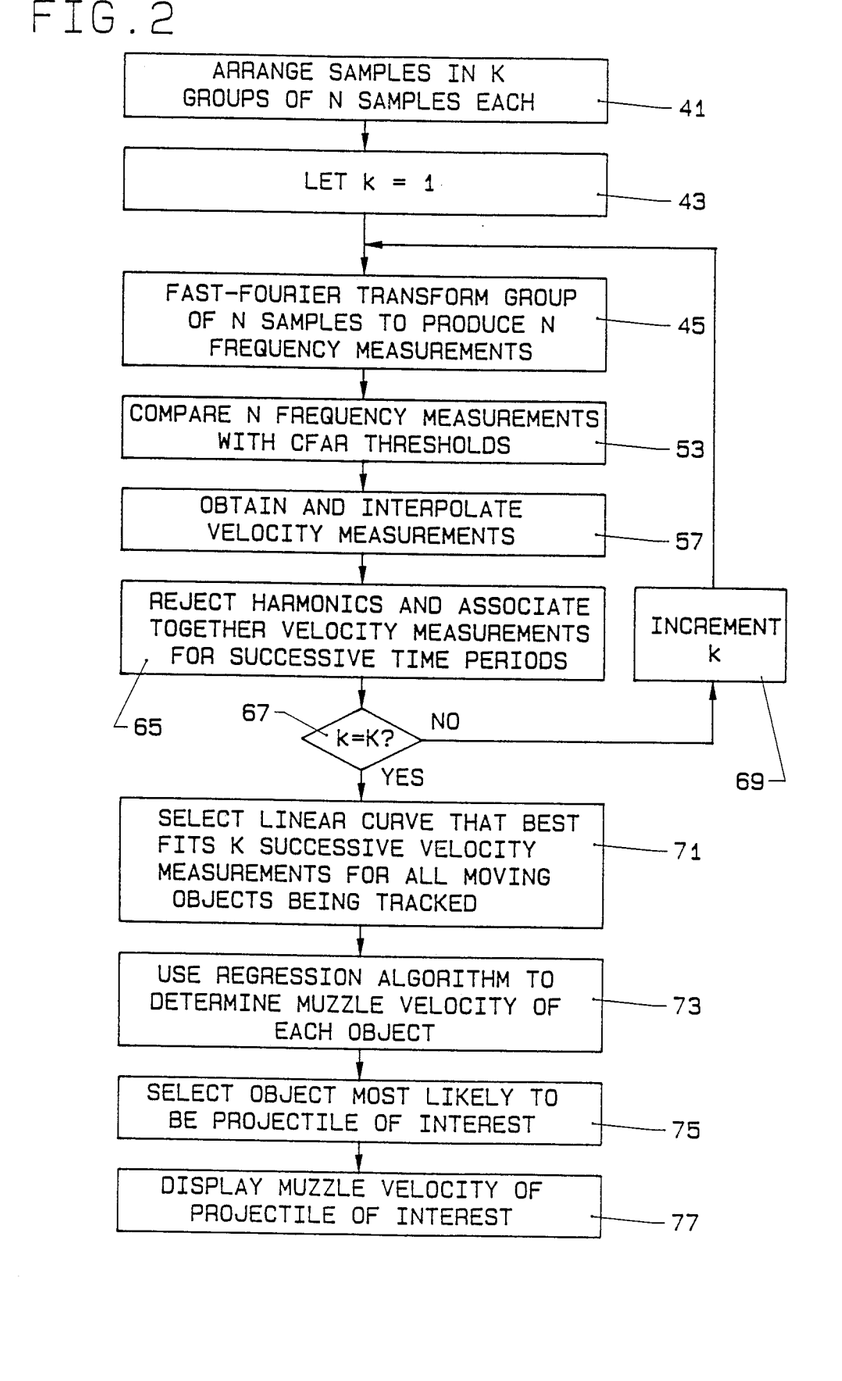
FIG. 2 is a simplified flowchart showing the operational steps performed by the signal processor of FIG. 1, in processing the information present in the radar Doppler signal to determine the projectile's muzzle velocity.

As previously mentioned, the signal processor 27 processes the successive Doppler signal samples stored in its random-access memory to determine the projectile's initial, muzzle velocity. A simplified flowchart of the operational steps the signal processor performs is depicted in FIG. 2. In an initial step 41, the Doppler signal samples are arranged into K groups of N time samples each, where K and N are integers, e.g., 30 and 1024 respectively. Each of the K successive groups represents a successive time segment in the Doppler signal. Succeeding steps in the flowchart will measure the projectile's average velocity during each such time segment. By noting a regular decrease in this velocity with time, a measure of the projectile's initial, muzzle velocity then can be deduced.

After the digitized time samples have been arranged in the predetermined sequence, the signal processor 27, at step 43, selects the first group of samples, which corresponds to the first time segment in the Doppler signal. The processor thereafter enters a loop that will be repeated for each of the K groups of samples.

Figure 3:
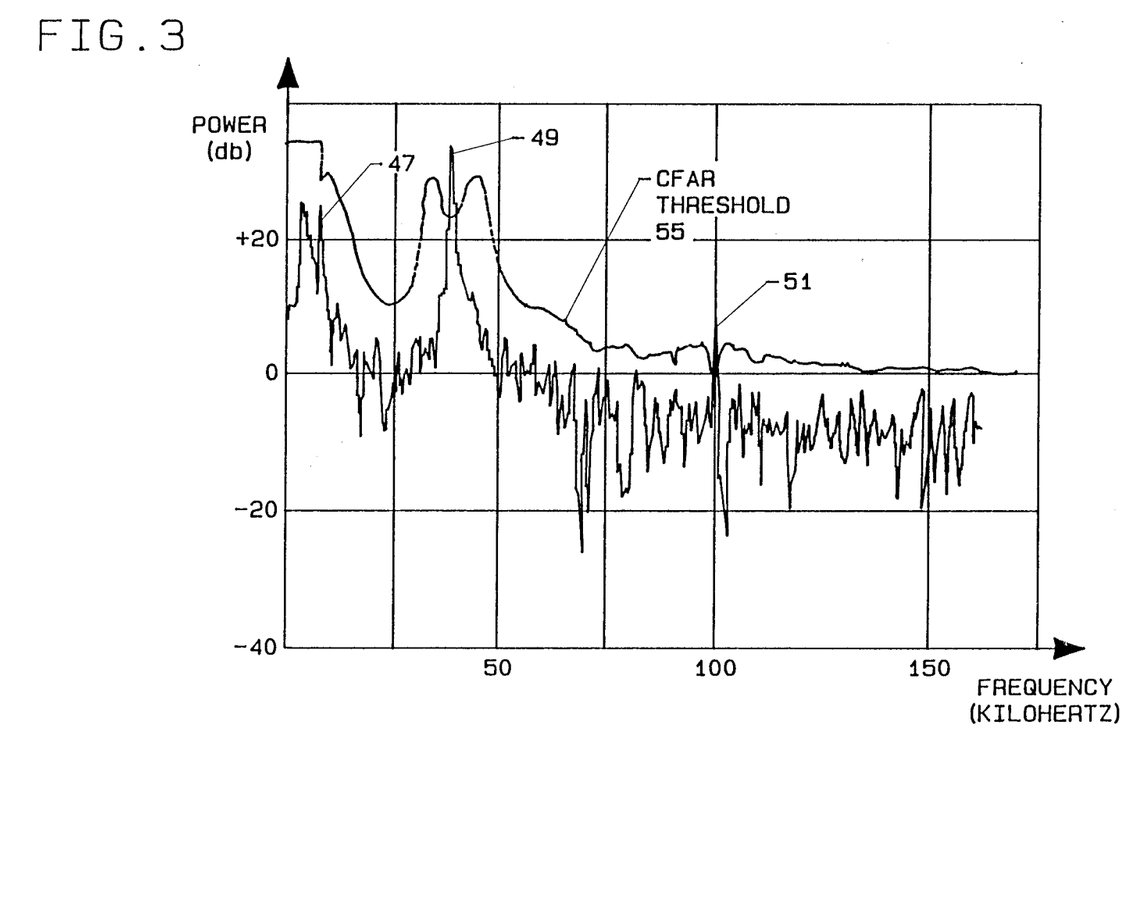
FIG. 3 is a graph showing the frequency spectrum of one exemplary time segment of a radar Doppler signal processed by the apparatus of FIG. 1, a variable threshold being superimposed on the graph and indicating the detection of one projectile and one group of fragments.

In an initial step 45 of the program loop, the signal processor 27 computes the fast-Fourier transform of the first group of N time samples. This produces a corresponding number of N frequency measurements, forming a frequency spectrum signal for the first group of samples, and thus for the first time segment of the Doppler signal. FIG. 3 depicts one such set of frequency measurements, for an exemplary group of N Doppler signal samples. Several peaks in the depicted frequency measurements will be noted, one such peak 47 at a relatively low frequency, a second peak 49 at an intermediate frequency, and a third peak 51 at a relatively high frequency. Significant noise is present across the entire frequency range. The low-frequency peak 47 is due principally to the ionization effect that occurs upon firing of the gun 13, as described above. The intermediate-frequency peak 49 is due to the presence of relatively slow-moving fragments 18 (FIG. 1) present in the general direction of the projectile 11 of interest. The relatively high-frequency peak 5 is due to a reflection from the projectile 11 of interest.

Figure 4:
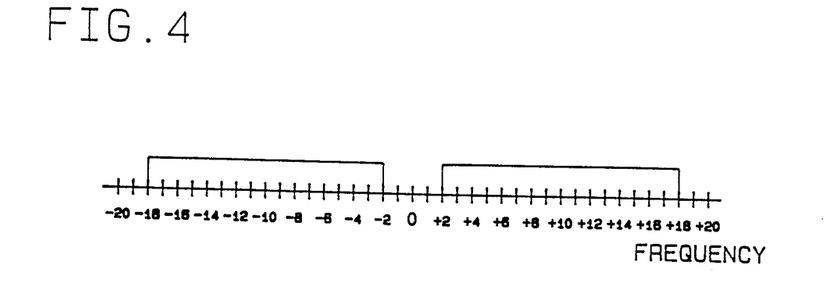
FIG. 4 is a schematic diagram showing a pair of closely-spaced, sliding windows that are used to produce a constant false alarm rate threshold with which the frequency measurement $f_o$ is compared by the signal processor of FIG. 1.

In a following step 53, the signal processor 27 detects the presence of peaks in the digital frequency spectrum of FIG. 3 by comparing each frequency measurement with a threshold 55 that is specially selected in accordance with the general noise level in its region of the spectrum. This variable threshold can be referred to as a constant false alarm rate (CFAR) threshold. For each frequency, the CFAR threshold is selected to be a certain fraction of the average of a predetermined plurality of frequency measurements immediately both above and below the frequency in question. Preferably, a sliding window gating technique is used, in which the frequency measurements on both sides of the frequency measurement in question, extending from two frequency increments away to eighteen frequency increments away, are averaged. This sliding window gating function is depicted schematically in FIG. 4.

The effect of the variable CFAR threshold technique described above is to cause the threshold 55 to be artificially increased for frequencies on both sides of the frequency of the projectile peak 51, because of the contribution of that measurement peak to those thresholds. This phenomenon is evident in FIG. 3, where it is observed that the threshold generally follows the level of the frequency measurements except in the region of peaks, where it increases substantially on each side of the peaks.

Figure 5:
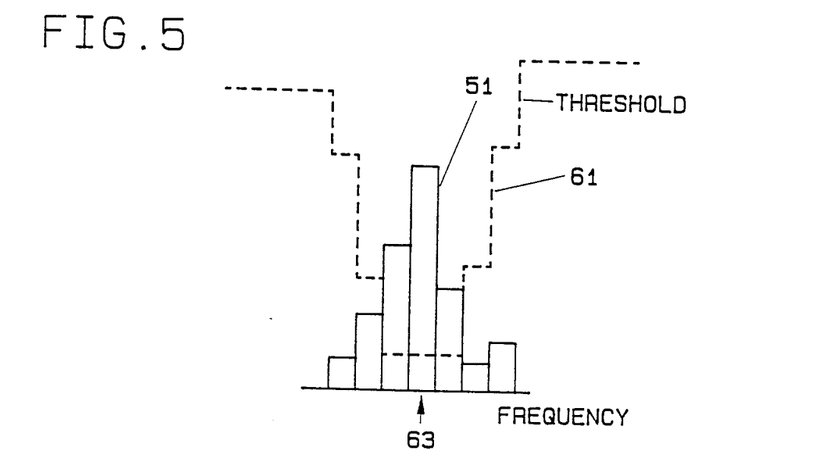
FIG. 5 is an expanded view of the portion of the graph of FIG. 3, where the frequency measurements corresponding to the projectile are shown to exceed their respective thresholds.

In a following step 57 of the program, the signal processor 27 examines the particular frequency measurements that are determined in step 53 to exceed their respective thresholds. Typically, two or three adjacent frequency measurements will exceed their thresholds. One exemplary situation is depicted in FIG. 5, where the measurements for several adjacent frequencies are depicted in bar graph form by solid lines 59 and their respective thresholds are depicted by dotted lines 61. In the depicted example, three adjacent frequency measurements exceed their respective thresholds. A more precise measure of the projectile's Doppler frequency, and thus velocity, is obtained by interpolating the three adjacent frequency measurements. In particular, the processor determines the weighted average, or center of gravity, of those adjacent measurements exceeding the threshold. This weighted average is indicated by the arrow 63 in FIG. 5. Interpolating in this fashion yields velocity measurements having a precision at least an order of magnitude greater than that provided by the peak frequency measurements, without interpolation.

In low signal-to-noise ratio situations, such as when the projectile 11 has moved a large distance away from the gun 13, sometimes just a single frequency measurement will exceed its CFAR threshold 55. When that occurs, the interpolation procedure of step 57 is modified to include not only the particular measurement exceeding the threshold, but also the two measurements immediately above and below it.

As previously mentioned, the CFAR thresholds 55 will frequently be exceeded by multiple frequency measurements, which represents not only the projectile 11 of interest, but also slower-moving fragments 18 associated with the projectile. In addition, because of distortion in the Doppler signal produced by the radar device 13, harmonics of these frequencies can sometimes also be present. Sometimes, these harmonics can even be of sufficient magnitude to cause their frequency measurements to exceed the thresholds. The signal processor 27 eliminates these effects in step 65. In particular, the signal processor compares the frequency of each measurement that exceeds its respective threshold with the frequencies of any lower frequency measurements that likewise exceed their respective thresholds. If the frequencies are harmonically related, the higher frequency measurement is disregarded.

Also in step 65, the signal processor 27 associates together each velocity measurement with the corresponding velocity measurements derived from previous groups of data. Of course, in the first pass through the program loop (steps 45–65), there are no such prior velocity measurements available, so this portion of step 65 is bypassed. However, in subsequent passes through the program loop, a separate file will be maintained for the successive velocity measurements derived for each moving object, including the projectile 11 of interest.

The association of each velocity measurement with prior velocity measurements determined to correspond to the same object is achieved by requiring each successive measurement to be within a prescribed percentage (e.g., 2 percent) of the measurement for the next preceding group of data. If the velocities of successive measurements differ by more than this percentage, it is assumed that they relate to different objects.

In a further step 67 of the program loop, the signal processor 27 determines whether or not the current pass through the loop is the last of the K passes. If it is not, the processor increments, at step 69, to the next succeeding group of Doppler signal samples, and makes another pass through the program loop, beginning with step 45.

On the hand, if it is determined at step 67 that all K groups of Doppler signal samples have been processed, the signal processor 27 proceeds to a number of additional steps in which the successive velocity measurements are further processed to arrive at a precise measure of the projectile's initial, muzzle velocity. At this stage of the processing, it should be noted that a separate file of up to K successive velocity measurements is stored for each object detected by the radar device 15 (FIG. 1). Each entry in each file represents the velocity measurement for a particular object during one of the K successive time periods. Because the velocities of the projectile 11 and fragments 18 generally decrease with time, these velocity measurements determinations should be uniformly decreasing. An example of this decreasing pattern is depicted in FIG. 6.

Figure 6:
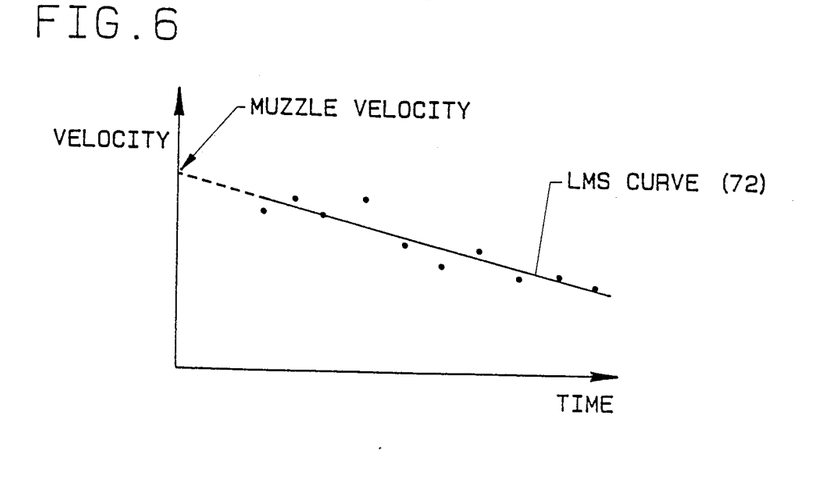
FIG. 6 is a graph showing the projectile velocity measurements for a number of successive time periods, with a least mean square error velocity profile also being shown and extended back to the moment of firing, to indicate the projectile's initial muzzle velocity.

In step 71, the signal processor 27 selects a particular linear curve 72 that best fits the file of generally decreasing velocity measurements, as shown in FIG. 6. A least mean square error (LMS) algorithm is preferably used in making this selection. It will be noted in FIG. 6 that several of the velocity measurements appear to differ substantially from the LMS linear curve estimate. In one detailed aspect of the invention, the processor disregards these particular velocity measurements and recomputes the linear curve based on the remaining velocity measurements, which are presumably more accurate. This process of eliminating those particular measurements that are considered to be excessively distant from the LMS curve can continue, in an iteratively, until a final, acceptable LMS curve is derived. This procedure is repeated for each file of velocity measurements, such that a separate LMS curve is derived for all of the moving objects detected, including the projectile 11 and any fragments 18.

After the final LMS curves have been derived, the signal processor 27, at step 73, uses an appropriate regression algorithm to determine the zero intercept of the LMS curve for each file. This corresponds to the initial, muzzle velocities of the projectile 11 and any fragments 18.

After determining the initial, muzzle velocities of the projectile 11 and any fragments 18, the signal processor 27, at step 75, selects the particular one of these determinations that is considered to be most likely that of the projectile 11. This determination can be made in accordance of any of a number of appropriate bases, such as signal strength, expected velocity, etc.

Finally, at step 77, the signal processor 27 displays the projectile's final muzzle velocity determination on the display device 31 (FIG. 1). In addition, and as mentioned briefly above, this muzzle velocity determination can be used in a fire control system (not shown in the drawings), in which an adjustment is made to the pointing direction of the gun barrel 13, for succeeding firings.

It should be appreciated from the foregoing description that the present invention provides an effective apparatus and method for accurately and precisely measuring the muzzle velocity of a projectile ejected from a gun barrel. A conventional radar Doppler signal is sampled and digitized and arranged in a succession of groups, each group representing a separate time period. A fast-Fourier transform is then computed for each group of samples, and peak frequency measurements in the transformed data are tracked from one time period to the next. These peaks indicate the velocities of the projectile of interest and any other nearby moving objects. Finally, a least mean square error curve fit and standard regression algorithm are used to deduce the projectile's initial, muzzle velocity. The invention provides accurate muzzle velocity determinations even in circumstances where the Doppler signal contains substantial interference caused, for example, by random noise and the presence of moving fragments in the direction of the projectile.

Although the present invention has been described in detail with reference to the presently preferred embodiment, those of ordinary skill in the art will appreciate that various modifications can be made without departing from the invention. Accordingly, the invention is defined only by the following claims.

I claim:

1. Doppler radar apparatus for determining the initial velocity of a projectile ejected from a muzzle, comprising:
    radar means for producing a Doppler signal indicative of movement of the projectile relative to the muzzle;
    Fourier transform means for operating on a predetermined plurality of segments of the Doppler signal, each segment representing a separate time period, to produce a corresponding plurality of frequency spectrum signals;
    detection means, responsive to the plurality of frequency spectrum signals, for measuring the velocity of the projectile during the time period associated with each successive segment of the Doppler signal, wherein the detection means includes comparator means for comparing each of the plurality of frequency spectrum signals with a prescribed threshold that varies with frequency and with the amount of superimposed noise, the comparator means also determining that portions of the signals exceeding the threshold result from one or more moving objects, including the projectile whose initial, muzzle velocity is being estimated; and
    regression means, responsive to the projectile velocities measured by the detection means for the plurality of successive time periods, for estimating the projectile's initial, muzzle velocity.

2. Doppler radar apparatus as defined in claim 1, wherein:
    the projectile whose velocity is to be measured is ejected from an explosive gun; and
    the apparatus further includes means for disabling the apparatus from measuring the projectile's velocity for a predetermined time period, until any ionization associated with firing of the gun has substantially dissipated.

3. Doppler radar apparatus as defined in claim 1, wherein the detection means further includes threshold means for producing a separate threshold for each of a plurality of frequencies in each of the plurality of frequency spectrum signals, each such threshold being selected in accordance with the levels of the frequency spectrum signal for nearby frequencies.

4. Doppler radar apparatus as defined in claim 3, wherein:
    the Fourier transform means includes
        analog-to-digital converter means for converting the Doppler signal to a sequence of digital words that are arranged in groups of N digital words each, and
        fast-Fourier transform means for operating on the N digital words in each successive group of words, to produce a range of discrete frequency signals for each group, each such range of discrete frequency measurements being a separate frequency spectrum signal; and
    the threshold means produces a separate threshold for each frequency measurement in each frequency spectrum signal, based on the average values of the discrete frequency measurements for a predetermined plurality of nearby frequencies.

5. Doppler radar apparatus as defined in claim 1, wherein the detection means further includes interpolation means operating on those portions of each of the plurality of frequency spectrum signals that are determined by the comparator means to exceed the threshold, to determine the average velocity of the projectile during the time period associated with each successive segment of the Doppler signal.

6. Doppler radar apparatus as defined in claim 1, wherein:
    one or more additional moving objects are located in the direction of the projectile; and
    the detection means includes means for measuring the respective velocities of the projectile and the one or more additional moving objects during the time period associated with each successive segment of the Doppler signal.

7. Doppler radar apparatus as defined in claim 6, wherein the detection means further includes association means for associating together the particular velocity measurements in each of the successive time periods corresponding to the respective projectile and the one or more additional moving objects, the association means including means for comparing each velocity measurement with velocity measurements made for previous time periods, if any.

8. Doppler radar apparatus as defined in claim 6, wherein the detection means includes means, operable during each time period, for comparing the velocity measurements of the projectile and the one or more additional moving objects to each other and for discarding any velocity measurement that is harmonically related to any other velocity measurement.

9. Doppler radar apparatus as defined in claim 1, wherein the regression means includes means for defining an initial velocity profile that provides the least mean square error based on the velocity measurements made by the detection means for the plurality of successive time periods.

10. Doppler radar apparatus as defined in claim 9, wherein the regression means further includes means for discarding any velocity measurements differing by more than a predetermined amount from the initial velocity profile and for redefining the velocity profile based on the velocity measurements remaining.

11. Doppler radar apparatus for determining the initial velocity of a projectile ejected from a gun muzzle, comprising:
- radar means for directing a radar signal at a projectile after it has been ejected from a gun muzzle, for receiving back a radar signal reflected from the projectile, and for producing a Doppler signal based on the reflected radar signal;
- analog-to-digital converter means for converting the Doppler signal to a sequence of digital words, arranged in K successive groups of N digital words each;
- fast-Fourier transform means for operating on the N digital words in each of the K successive groups, to produce N discrete frequency measurements for each group;
- comparator means for comparing each of the N discrete frequency measurements in each group with a prescribed threshold that is selected in accordance with the average value of frequency measurements for nearby frequencies, the comparator means determining that frequency measurements exceeding their respective thresholds result from one or more moving objects, including the projectile whose initial, muzzle velocity is being estimated;
- interpolation means for determining the weighted average of those frequency measurements determined by the comparator means to exceed their respective thresholds, to determine the average velocities of the projectile and any other moving object during the time period associated with each group of digital words;
- association means for associating together the particular velocity measurements in each of the successive time periods corresponding to the respective projectile and one or more additional moving objects, the association means including means for comparing each velocity measurement with velocity measurements made for previous time periods, if any;
- harmonic elimination means, operable during each time period, for comparing the velocity measurements of the projectile and one or more additional moving objects to each other and for discarding any velocity measurements that is harmonically related to any other velocity measurement;
- regression means for defining an initial velocity profile that provides the least mean square error based on the velocity measurements made by the interpolation means and association means for the plurality of successive time periods, the regression means including means for discarding any velocity measurements differing by more than a predetermined amount from the initial velocity profile and for redefining the velocity profile based on the velocity measurements remaining, the redefined velocity profile indicating the projectile's initial, muzzle velocity; and
- means for disabling the apparatus from measuring the projectile's velocity for a predetermined time period, until any ionization associated with firing of the gun has substantially dissipated.

12. Doppler radar apparatus for determining the initial velocity of a projectile ejected from a gun muzzle, comprising:
- radar means for directing a radar signal at a projectile after it has been ejected from a gun muzzle, for receiving back a radar signal reflected from the projectile, and for producing a Doppler signal based on the reflected radar signal;
- analog-to-digital converter means for converting the Doppler signal to a sequence of digital words, arranged in K successive groups of N digital words each;
- fast-Fourier transform means for operating on the N digital words in each of the K successive groups, to produce a range of discrete frequency measurements for each group, each such range representing the frequency spectrum for a separate time segment of the Doppler signal;
- detection means for operating on the range of discrete frequency measurements for each of the K groups, to measure the velocity of the projectile during the time period associated with the corresponding group of N digital words, wherein the detection means includes comparator means for comparing each of the plurality of frequency measurements with a prescribed threshold that varies in accordance with the levels of frequency measurements for nearby frequencies and for determining that frequency measurements exceeding the threshold result from one or more moving objects, including the projectile whose initial, muzzle velocity is being estimated; and
- regression means for operating on the K successive projectile velocity measurements, to estimate the projectile's initial, muzzle velocity.

13. Doppler radar apparatus as defined in claim 12, wherein:
- the projectile whose velocity is to be measured is ejected from an explosive gun; and
- the apparatus further includes means for disabling the apparatus from measuring the projectile's velocity for a predetermined time period, until any ionization associated with firing of the gun has substantially dissipated.

14. Doppler radar apparatus as defined in claim 12, wherein the detection means further includes interpolation means for determining the weighted average of those frequency measurements determined by the comparator means to exceed their respective thresholds, to determine the average velocity of the projectile during the time period associated with each successive time segment of the Doppler signal.

15. Doppler radar apparatus as defined in claim 12, wherein:
one or more additional moving objects are located in the direction of the projectile; and
the detection means includes means for measuring the respective velocities of the projectile and the one or more additional moving objects during the time period associated with each successive segment of the Doppler signal.

16. Doppler radar apparatus as defined in claim 15, wherein the detection means further includes association means for associating together the particular velocity measurements in each of the successive time periods corresponding to the respective projectile and one or more additional moving objects, the association means including means for comparing each velocity measurement with velocity measurements made for previous time periods, if any.

17. Doppler radar apparatus as defined in claim 15, wherein the detection means includes means, operable during each time period, for comparing the velocity measurements of the projectile and one or more additional moving objects to each other and for discarding any velocity measurement that is harmonically related to any other velocity measurement.

18. Doppler radar apparatus as defined in claim 12, wherein the regression means includes means for defining an initial velocity profile that provides the least mean square error based on the velocity measurements made by the detection means for the plurality of successive time periods.

19. Doppler radar apparatus as defined in claim 18, wherein the regression means further includes means for discarding any velocity measurements differing by more than a predetermined amount from the initial velocity profile and for redefining the velocity profile based on the velocity measurements remaining.

20. Doppler radar method for determining the initial velocity of a projectile ejected from a muzzle, comprising steps of:
producing a Doppler signal indicative of movement of the projectile relative to the muzzle;
operating on a predetermined plurality of segments of the Doppler signal, each segment representing a separate time period, to produce a corresponding plurality of frequency spectrum signals;
processing the plurality of frequency spectrum signals to measure the velocity of the projectile during the time period associated with each successive segment of the Doppler signal, wherein the step of processing includes steps of
comparing each of the plurality of frequency spectrum signals with a prescribed threshold that varies with frequency and with the amount of superimposed noise, and
determining that portions of the signals exceeding the threshold result from one or more moving objects, including the projectile whose initial, muzzle velocity is being estimated; and
estimating the projectile's initial, muzzle velocity based on the projectile velocities measured by the step of processing for the plurality of successive time periods.

21. A Doppler radar method as defined in claim 20, wherein the step of processing further includes a step of producing a separate threshold for each of a plurality of frequencies in each of the plurality of frequency spectrum signals, each such threshold being selected in accordance with the levels of the frequency spectrum signal for nearby frequencies.

22. A Doppler radar method as defined in claim 21, wherein:
the step of operating includes steps of
converting the Doppler signal to a sequence of digital words that are arranged in groups of N digital words each, and
operating on the N digital words in each successive group of words, to produce a range of discrete frequency measurements for each group, each such range of discrete frequency measurements being a separate frequency spectrum signal; and
the step of producing includes a step of producing a separate threshold for each frequency measurement in each frequency spectrum signal, based on the average values of the discrete frequency measurements for a predetermined plurality of nearby frequencies.

23. A Doppler radar method as defined in claim 20, wherein the step of processing further includes a step of interpolating those portions of each of the plurality of frequency spectrum signals that are determined in the step of comparing to exceed the threshold, to determine the average velocity of the projectile during the time period associated with each successive segment of the Doppler signal.

24. A Doppler radar method as defined in claim 20, wherein:
one or more additional moving objects are located in the direction of the projectile; and
the step of processing includes a step of measuring the respective velocities of the projectile and the one or more additional moving objects during the time period associated with each successive segment of the Doppler signal.

25. A Doppler radar method as defined in claim 24, wherein the step of processing further includes a step of associating together the particular velocity measurements in each of the successive time periods corresponding to the respective projectile and the one or more additional moving objects, the step of associating including a step of comparing each velocity measurement with velocity measurements made for previous time periods, if any.

26. A Doppler radar method as defined in claim 24, wherein the step of processing includes a step of comparing the velocity measurements to each other during each time period and discarding any velocity measurement that is harmonically related to any other velocity measurement.

27. A Doppler radar method as defined in claim 20, wherein the step of estimating includes a step of defining an initial velocity profile that provides the least mean square error based on the velocity measurements made in the step of processing for the plurality of successive time periods.

28. A Doppler radar method as defined in claim 27, wherein the step of estimating further includes steps of discarding any velocity measurements differing by more than a predetermined amount from the initial velocity profile, and redefining the velocity profile based on the velocity measurements remaining.

29. A Doppler radar method as defined in claim 20, wherein:
the projectile whose velocity is to be measured is ejected from an explosive gun; and
the method further includes a step of inhibiting the method from measuring the projectile's velocity for a predetermined time period, until any ionization associated with firing of the gun has substantially dissipated.

* * * * *